(12) United States Patent
Kim

(10) Patent No.: US 8,036,108 B2
(45) Date of Patent: Oct. 11, 2011

(54) METHOD AND APPARATUS FOR PROVIDING GATEWAY TO TRANSMIT IPV6 PACKET IN A WIRELESS LOCAL AREA NETWORK SYSTEM

(75) Inventor: Jin-Hyoung Kim, Hwaseong-si (KR)

(73) Assignee: Samsung Electronics Co., Ltd., Maetan-dong, Yeongtong-gu, Suwon-si, Gyeonggi-do (KR)

( * ) Notice: Subject to any disclaimer, the term of this patent is extended or adjusted under 35 U.S.C. 154(b) by 315 days.

(21) Appl. No.: 12/210,285

(22) Filed: Sep. 15, 2008

(65) Prior Publication Data

US 2009/0073983 A1 Mar. 19, 2009

(30) Foreign Application Priority Data

Sep. 13, 2007 (KR) ........................ 10-2007-0093163

(51) Int. Cl.
*H04L 1/00* (2006.01)
*H04L 12/26* (2006.01)
*H04J 3/14* (2006.01)
*H04J 1/16* (2006.01)

(52) U.S. Cl. ..................... 370/229; 370/230.1; 370/231; 370/232

(58) Field of Classification Search .................. 365/222; 370/389, 401, 328, 392, 254, 349; 709/232; 700/9; 455/404.2
See application file for complete search history.

(56) References Cited

U.S. PATENT DOCUMENTS

2007/0030848 A1* 2/2007 Miyata et al. ................. 370/389
* cited by examiner

*Primary Examiner* — Kwang B Yao
*Assistant Examiner* — Adam Duda
(74) *Attorney, Agent, or Firm* — Cha & Reiter, LLC

(57) ABSTRACT

A method and apparatus for providing a gateway for IPv6 packet transmission in a WLAN system are provided, in which a gateway takes over a TCP/IP protocol stack from a legacy 6LoWPAN node for providing a gateway for IPv6 packet transmission in a WLAN system. One or more service request messages for data communications are received from a plurality of 6LoWPAN nodes, and a virtual interface is generated for allocating IPv6 addresses to the 6LoWPAN nodes by adding a predetermined IPv6 address prefix to addresses of the 6LoWPAN nodes set in the service request messages. A socket adaptation layer is interfaced for receiving the IPv6 addresses from the virtual interface and transmitting data packets to the 6LoWPAN nodes, and when data packets are transmitted and received to and from the 6LoW-PAN nodes, an on-going file is controlled and managed, and the data packets are routed.

13 Claims, 13 Drawing Sheets

METHOD AND APPARATUS FOR PROVIDING GATEWAY TO TRANSMIT IPV6 PACKET IN A WIRELESS LOCAL AREA NETWORK SYSTEM

CLAIM OF PRIORITY

This application claims the benefit of priority under 35 U.S.C. §119(a) from a Korean Patent Application filed in the Korean Intellectual Property Office on Sep. 13, 2007 and assigned Serial No. 2007-93163, the entire disclosure of which is hereby incorporated by reference in its entirety.

BACKGROUND OF THE INVENTION

1. Field of the Invention

The present invention generally relates to an Internet Protocol version 6 over Low power Wireless Personal Area Network (6LoWPAN) for transmitting an IPv6 packet over an Institute of Electrical and Electronics Engineers (IEEE) 802.15.4 network. More particularly, the present invention relates to a method and apparatus for providing a gateway for IPv6 packet transmission in a Wireless Local Area Network (WLAN) system, for simplifying the protocol stack of a 6LoWPAN node.

2. Description of the Related Art

Recently, 6LowPAN has attracted a great deal of interest, as manufacturers see a market with large potential for growth.

FIG. 1 illustrates a network configuration in which a 6LoWPAN protocol stack is applied to a conventional IEEE 802.15.4 network. Referring to FIG. 1, in a 6LoWPAN network, a 6LoWPAN host 112, a 6LoWPAN node 114, and a host 110 within an external IP network are interconnected, so that wireless personal communications or data communications with the external network can occur. In the 6LoWPAN network, one of a plurality of 6LoWPAN nodes connected to the IEEE 802.15.4 network serves as a host and performs a TCP/IP communication protocol by 6LoWPAN network processing. Hence, the 6LoWPAN host 112 allocates IPv6 addresses to a plurality of 6LoWPAN nodes connected thereto, so that the 6LoWPAN nodes can exchange data with the host 110 within the external IP network. As IPv6 usually uses a 126-bit address system, the use of these addresses in a sensor network enables IP allocation to each sensor node.

Hence, conventional communication protocols for the Internet, such as IPv6 and TCP/UDP, can be used as higher layers above IEEE 802.15.4 Medium Access Control/Physical (MAC/PHY) layers. Since an IPv6 address is allocated to each sensor node in the 6LoWPAN network, data communication is possible between a 6LoWPAN node and the host within the external IP network and the 6LoWPAN host within the 6LoWPAN network can control each sensor node.

The IEEE 802.15.4 network uses a physical packet of up to 127 bytes and a MAC frame of 102 bytes. However, up to 1280 bytes can be transmitted in IPv6. This means that the 6LoWPAN network should fragment packets. For a maximum transmission traffic amount in the 6LoWPAN network, considering a physical packet size of 127 bytes, a maximum overhead per frame of 15 bytes, and a link layer security overhead, only 81-bytes of data can be transmitted in the IEEE 802.15.4 network. Since the header of an IPv6 packet is 40 bytes, 41 bytes are available, but a User Datagram Protocol (UDP) header occupies 8 bytes. Thus, in actuality, only 33 bytes are available, and the result is that header compression is required.

Packet fragmentation and the header compression take place in an adaptation layer of the communication protocol stack of the 6LoWPAN host 112. The TCP/IP stack responsible for the packet fragmentation and the header compression is already designed in a legacy host. Hence, the 6LoWPAN host 112 fragments a packet and compresses a header in a TCP/IP layer, thereby increasing power consumption and decreasing the lifetime of the 6LoWPAN node. This is against the development trend of 6LoWPAN nodes toward low power, small size, and small memory.

Moreover, because all operations based on network processing, including TCP SYN, ACK, and ICMP packets (ping, unreachable packet), are carried out in 6LoWPAN nodes, traffic increases between the 6LoWPAN network and the IEEE 802.15.4 wireless network.

Accordingly, the following IPv6 packet headers should be delivered uncompressed between the 6LoWPAN node 112 and the 6LoWPAN node 114 in the 6LoWPAN network, thus increasing overhead.

HOP-by-HOP Options Header
Routing Header
Fragment Header
Destination Options Header Although more advanced network technologies are required along with the increased performance of a 6LoWPAN network system aiming at low power and small size, the existence of a TCP/IP protocol stack for packet transmission in a legacy 6LoWPAN host and a small-size memory leads to a traffic increase between networks and a load increase in 6LoWPAN nodes. As a consequence, reliable data communications are not guaranteed.

SUMMARY OF THE INVENTION

The present invention provides a method and apparatus for providing a gateway for IPv6 packet transmission in a WLAN system, such that the gateway implements a TCP/IP stack for IPv6 packet transmission, instead of a 6LoWPAN node under development, to thereby simplify the protocol stack of the 6LoWPAN node.

In accordance with an exemplary aspect of the present invention, there is provided a method for providing a gateway for IPv6 packet transmission in a WLAN system, in which service request messages for data communications are received from a plurality of 6LoWPAN nodes, a virtual interface is generated for allocating IPv6 addresses to the 6LoWPAN nodes by adding a predetermined IPv6 address prefix to addresses of the 6LoWPAN nodes set in the service request messages, a socket adaptation layer is an interface for receiving the IPv6 addresses from the virtual interface, and transmitting data packets to the 6LoWPAN nodes, and when data packets are transmitted and received to and from the 6LoWPAN nodes, an on-going file is controlled and managed and the data packets are routed.

In accordance with another exemplary aspect of the present invention, there is provided a gateway apparatus for IPv6 packet transmission in a WLAN system, in which a 6LoWPAN socket adaptation layer interfaces with socket adaptation layers of a plurality of 6LoWPAN nodes and receives data communication request messages from the 6LoWPAN nodes, a virtual interface allocates IPv6 addresses to the 6LoWPAN nodes by adding a predetermined IPv6 address prefix to addresses of the 6LoWPAN nodes, and a 6LoWPAN middleware including a TCP/UDP layer for controlling and managing an on-going file and routing data packets, when the data packets are transmitted and received to and from the 6LoWPAN nodes.

In accordance with another exemplary aspect of the present invention, a gateway apparatus for Internet Protocol version 6 (IPv6) packet transmission in a Wireless Local Area Network (WLAN) system, comprises:

means for receiving service request messages for data communications from a plurality of IPv6 over Low Power Wireless Personal Area Network (6LoWPAN) nodes;

a virtual interface for allocating IPv6 addresses to the 6LoWPAN nodes by adding a predetermined IPv6 address prefix to addresses of the 6LoWPAN nodes set in the service request messages;

a socket adaptation layer interfaced for receiving the IPv6 addresses from the virtual interface and transmitting data packets to the 6LoWPAN nodes; and means for controlling and managing an on-going file and routing data packets when the data packets are transmitted and received to/from the 6LoWPAN nodes.

BRIEF DESCRIPTION OF THE DRAWINGS

The above and other objects, features and advantages of certain exemplary embodiments of the present invention discussed herein will be more apparent from the following detailed description taken in conjunction with the accompanying drawings, in which.

Throughout the drawings, the same drawing reference numerals will be understood to refer to the same elements, features and structures.

DETAILED DESCRIPTION

The matters defined in the description such as a detailed construction and elements are provided to assist in a comprehensive understanding of exemplary embodiments of the invention by a person of ordinary skill in the art. Accordingly, those of ordinary skill in the art will recognize that various changes and modifications of the exemplary embodiments described herein can be made without departing from spirit of the invention and the scope of the appended claims. Also, descriptions of well-known functions and constructions may be omitted for clarity and conciseness when their inclusion might obscure appreciation of the subject matter of the claimed invention by an artisan.

A method and apparatus for providing a gateway for IPv6 packet transmission in a WLAN system according to the present invention typically includes the gateway taking over a function of a TCP/IP protocol stack from a conventional 6LoWPAN node. Therefore, the gateway operates as a 6LoWPAN middleware, responsible for implementing the TCP/IP protocol stack, as well as for implementing a conventional gateway.

In the present invention, as 6LoWPAN allocates an IPv6 address to each sensor node, the sensor node communicates with a host in an external IP network, and a host that communicates with the sensor node can control the sensor node.

Figure 1:
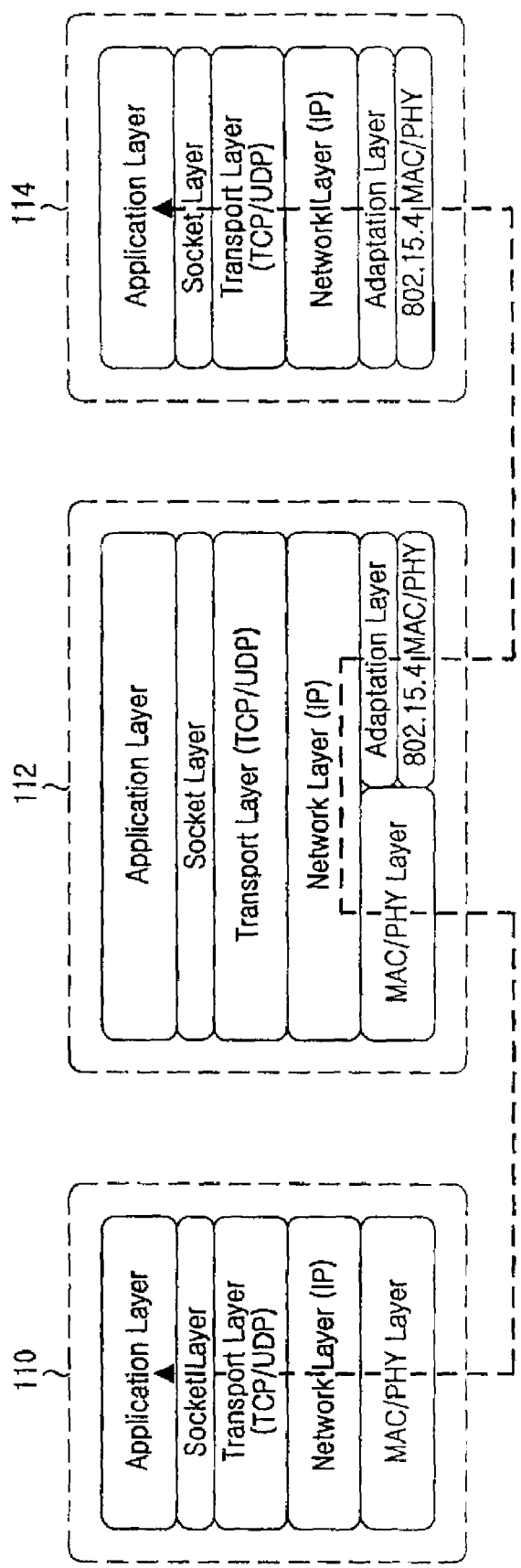
FIG. 1 illustrates a network configuration in which a 6LoWPAN protocol stack is applied to a conventional IEEE 802.15.4 network.
Figure 2A:
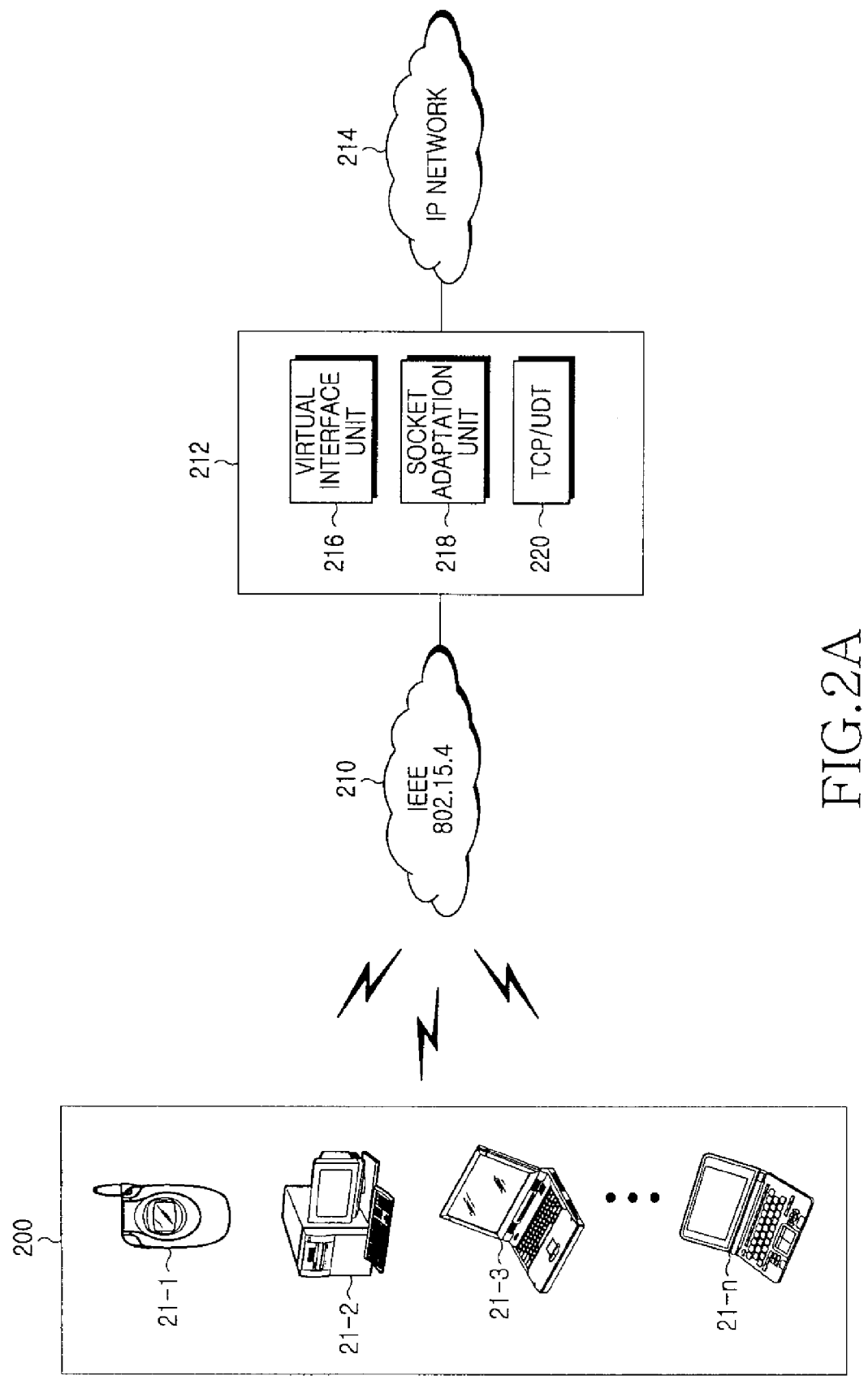
FIGS. 2A and 2B illustrate a network configuration that provides a middleware for IPv6 packet transmission in a WLAN system according to an exemplary embodiment of the present invention.
Figure 2B:
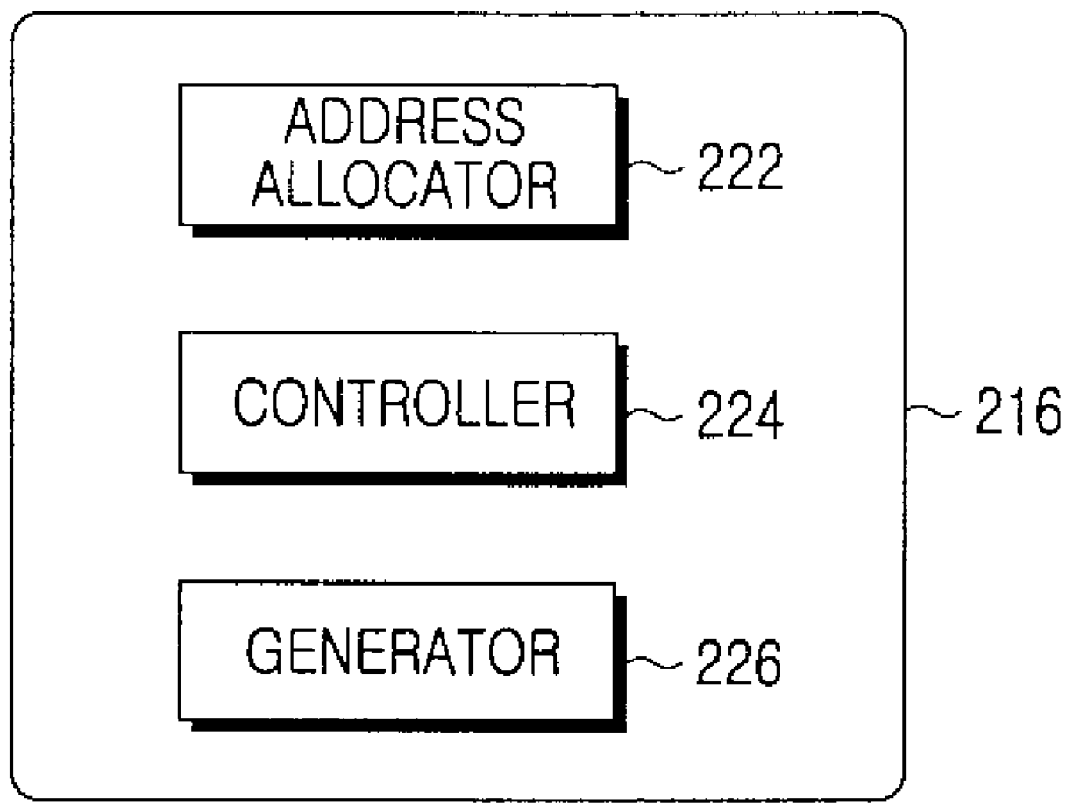

FIGS. 2A and 2B illustrate a network configuration that provides a middleware for IPv6 packet transmission in a WLAN system according to one exemplary embodiment of the present invention.

Referring to FIG. 2A, an IEEE 802.15.4 network 210, a gateway apparatus 212, and a plurality of 6LoWPAN nodes (21-1 to 21-n) are connected to one another.

The IEEE 802.15.4 network 210 supports a low-power wireless sensor network in compliance with the WLAN standard.

The gateway apparatus 212 serves as a gateway that connects between heterogeneous communication networks having different protocols and as a host of the 6LoWPAN nodes 21-1 to 21-n. Upon receipt of Association-Requests from the 6LoWPAN nodes 21-1 to 21-n (in box 200) over the IEEE 802.15.4 network 210, the gateway apparatus 212 creates virtual interfaces for the respective 6LoWPAN nodes 21-1 to 21-n and allocates IPv6 addresses to them via the virtual interfaces. When transmitting and receiving IPv6 packets to and from the 6LoWPAN nodes 21-1 to 21-n, the gateway apparatus 212 controls and manages on-going files and provides the routing paths to the 6LoWPAN nodes 21-1 to 21-n. The 6LoWPAN nodes 21-1 to 21-n receive the IPv6 packets from the gateway apparatus 212 over the IEEE 802.15.4 network, for communications.

More specifically, with reference to FIGS. 2A and 2B, a virtual interface unit 216 of the gateway apparatus 212 includes an address allocator 222, a controller 224, and a generator 226 as illustrated in FIG. 2B.

Upon receipt of Association-Requests from the 6LoWPAN nodes 21-1 to 21-n, the address allocator 222 allocates addresses to said nodes 21- to 21-n according to predetermined IPv6 address information using 64-bit addresses received in the Association-Requests.

Still referring to FIG. 2B, the controller 224 updates a routing table for controlling the routing path of an IPv6 packet directed to an address.

The generator 226 generates a pool of file descriptors and ports to access an on-going file.

A method for providing a gateway for IPv6 packet transmission in the WLAN system according to an exemplary embodiment of the present invention will now be described with reference to FIG. 3.

Figure 3:
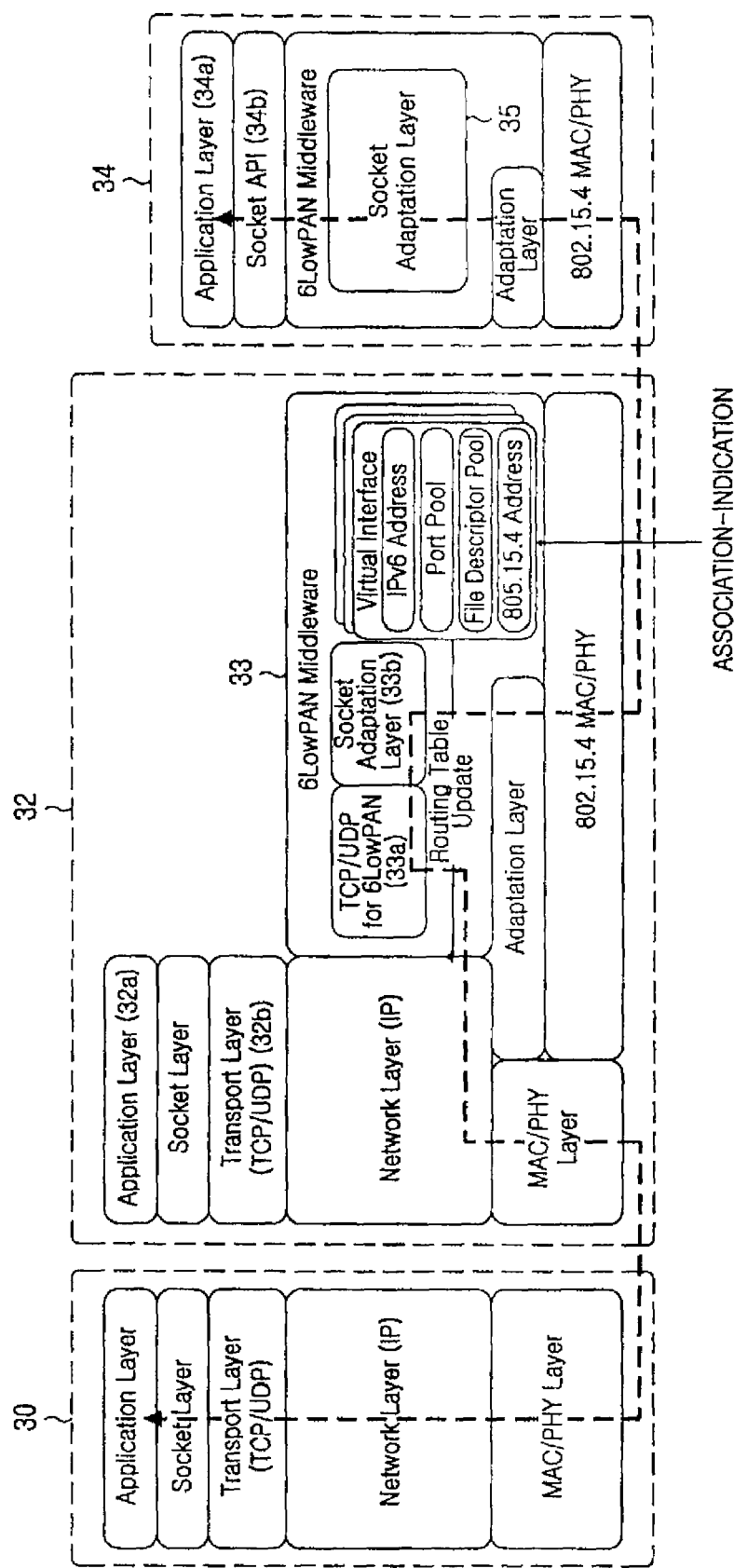
FIG. 3 illustrates a network configuration in which a 6LoWPAN protocol stack is applied to an IEEE 802.15.4 network in a method for providing a gateway for IPv6 packet transmission in the WLAN system according to an exemplary embodiment of the present invention.

FIG. 3 illustrates a network configuration in which a 6LoWPAN protocol stack is applied to an IEEE 802.15.4 network in the method for providing a gateway for IPv6 packet transmission in the WLAN system according to an exemplary embodiment of the present invention.

Referring to FIG. 3, a gateway apparatus 32 has a protocol stack including a MAC/PHY layer, an adaptation layer, an 802.15.4 MAC/PHY layer, a network layer, a transport layer, a socket layer, an application layer, and a 6LoWPAN middleware 33.

When the gateway apparatus 32 is connected to a 6LoWPAN node 34 and a host 30 within an external IP network, and transmits IPv6 packets to carry out wireless personal communications or data communications with the external network, the highest layer of the gateway apparatus 32, i.e. the application layer 32a, takes charge of forming an IPv6 packet and setting its destination by the user of the host 30 within the external IP network, for example, e-mail writing and recipient address input.

An IPv6 packet outgoing from the user 34 is transmitted through the MAC/PHY layer, the network layer, the transport layer, the socket layer, and the application layer 34*a*. For the user of the 6LoWPAN node 34 to conduct communications, the 6LoWPAN middleware 33 in the gateway apparatus 32 generates a virtual interface for each node, allocates an address, and updates a routing table. The 6LoWPAN middleware 33 transmits a packet to the host 30 through its network layer (IP) and MAC/PHY layer.

After passing through the transport layer, the socket layer, and the application layer of the host 30 within the external IP network, the packet is output to a final user. The 6LoWPAN middleware 33 transmits a packet to the 6LoWPAN node 34 via the 802.15.4 MAC/PHY layer. The packet is output to a final user via the application layer, a 6LoWPAN middleware 35, a socket API 34*b*, and an application layer 34*a*.

A TCP/UDP 33*a* for 6LoWPAN protocol stack in the 6LoWPAN middleware 33 of the gateway apparatus 32 is distinguished from a TCP/UDP layer 32*a* of the gateway apparatus 32. The TCP/UDP for 6LoWPAN protocol stack is a socket layer/OS/network layer in the protocol stack of a typical gateway apparatus, such as 32. The TCP/UDP for 6LoWPAN protocol stack in the middleware 33 is used for communications with the 6LoWPAN node. When the 6LoWPAN middleware 33 receives Association-Requests from a plurality of 6LoWPAN nodes, the TCP/UDP layer is not suitable for operations such as checking a file descriptor and a port number. Thus, the TCP/UDP for 6LoWPAN protocol stack in the gateway apparatus 32 is used.

The socket adaptation layer 33*b* of the 6LoWPAN middleware 33, which is the counterpart of the socket adaptation layer of the 6LoWPAN node, interfaces between the TCP/UDP stack 33*a* of the 6LoWPAN middleware 33 and the socket API 34*b* of the 6LoWPAN node.

Figure 4:
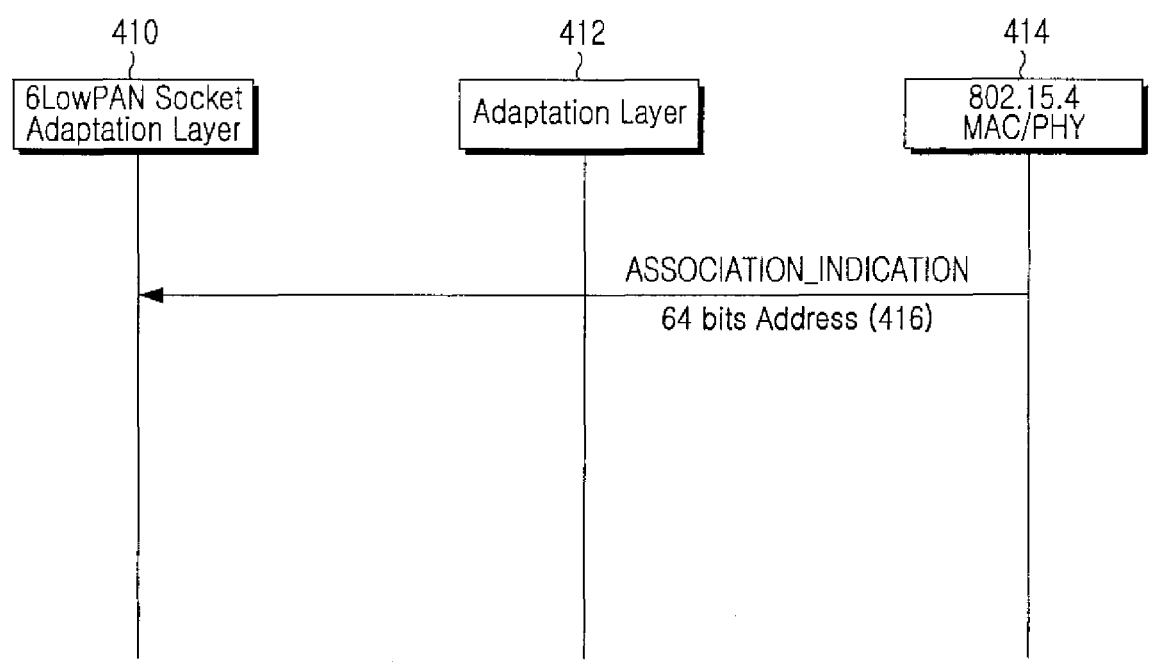
FIG. 4 is an exemplary diagram illustrating a signal flow within a gateway apparatus according to the present invention.

FIG. 4 is a diagram illustrating a signal flow within the gateway apparatus according to the present invention.

Referring now to FIG. 4, the gateway apparatus 32 receives Association_Indications from a plurality of 6LoWPAN nodes in step 416. The Association_Indications are received in an 802.15.4 MAC/PHY layer 414 and provided to a 6LoWPAN socket adaptation layer 410 of the 6LoWPAN middleware through an application layer 412. The 6LoWPAN socket adaptation layer 410 creates virtual interfaces for the respective 6LoWPAN nodes, allocates IPv6 addresses to them based on 64-bit addresses received in the Association_Indications and predetermined IPv6 information, generates a file descriptor pool and a port pool, and updates routing tables in the network layer of the gateway, thereby conducting data communications between the 6LoWPAN middleware and the 6LoWPAN nodes.

An operation of the socket adaptation layer in the 6LoWPAN middleware 33 being the counterpart of a socket adaptation layer in a 6LoWPAN node will now be described with reference to FIGS. 5A to 8B. The socket adaptation layer of the 6LoWPAN middleware interfaces between the TCP/UDP stack and the socket API of the 6LoWPAN node and enables data transmission/reception to/from a network as a gateway using TCP/IP in an application program.

The socket API of the 6LoWPAN node uses a sockaddr_in6 structure configured as follows:

```
struct sockaddr_in6 {
    unsigned   short int   sin6_family;        /* AF_INET6 */
    _u16                                       sin6_port;
    /* Transport layer port # */
    _u32       sin6_flowinfo;                  /*
    IPv6 flow information */
    struct     in6_addr     sin6_addr;
    /* IPv6 address */
    _u32       sin6_scope_id;                  /*
    scope id (new in RFC2553) */
};
``` where sin6_family is always AF_INET6 and flowinfo and scope id are not usually used. Therefore, when the socket adaptation layer of the 6LoWPAN node transmits this structure to the gateway apparatus, it delivers only port information and address information.

A message carrying the port information and address information is formatted as follows. Since the address of the 6LoWPAN node 34 is in a virtual interface of the 6LoWPAN middleware of the gateway apparatus, the address information includes only the address of the host of the other party.

| Sock_adapt_in6_info | |
|---|---|
| Port (8 bits) | IPv6 Address (128 bits) |

FIGS. 5A to 8B are diagrams illustrating exemplary signal flows for IPv6 packet transmission and reception between a 6LoWPAN middleware 50 of the gateway apparatus and a 6LoWPAN node according to the present invention.

Figure 5A:
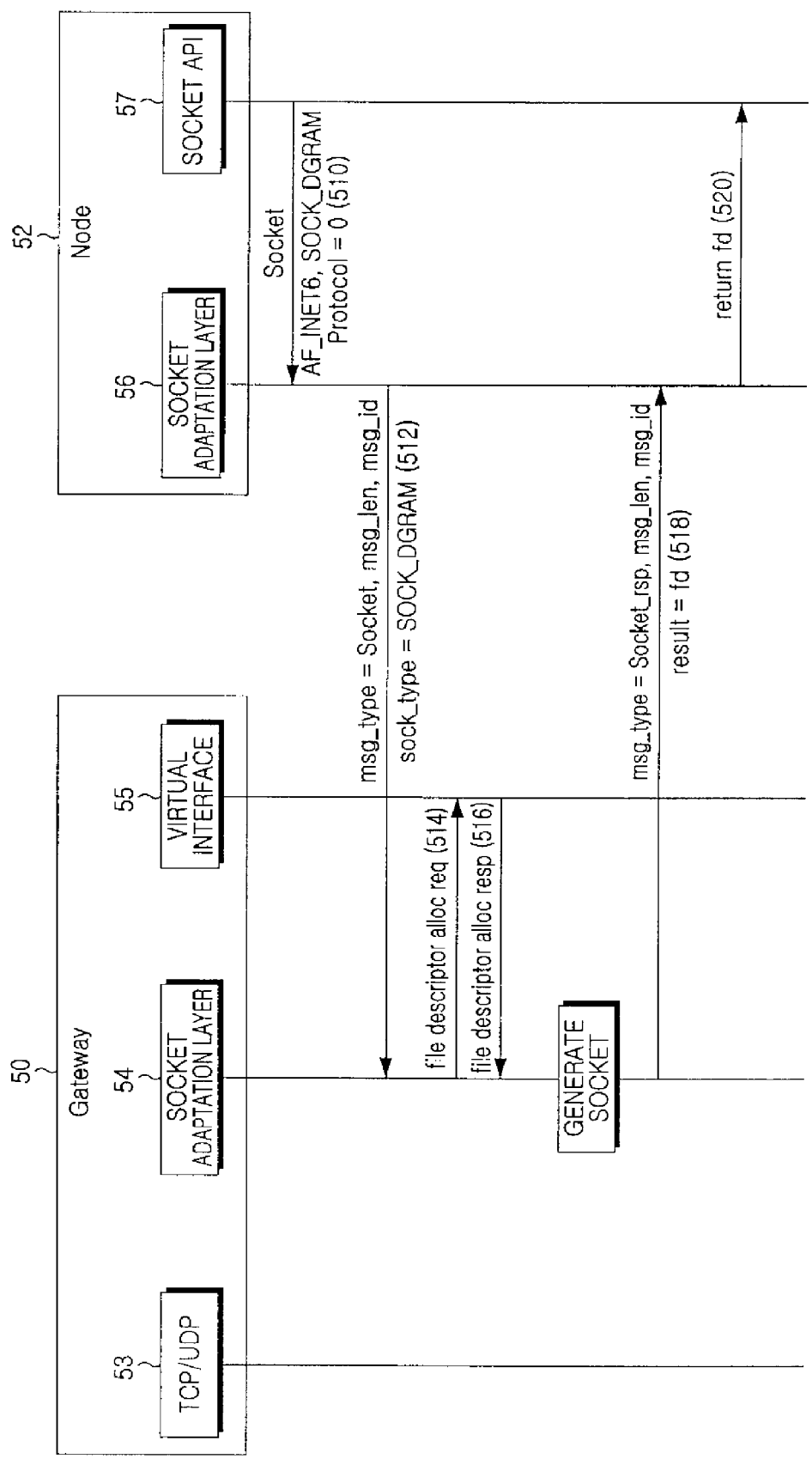
FIGS. 5A to 8B are diagrams illustrating signals flows for IPv6 packet transmission and reception between a 6LoWPAN middleware of the gateway apparatus and a 6LoWPAN node according to the present invention.

Referring now to FIG. 5A, a socket API 57 of a 6LoWPAN node 52 calls and opens a transmission socket for use in communications to a socket adaptation layer 56 of the 6LoWPAN node 52 in step 510. When the transmission socket is open, the socket adaptation layer 56 selects SOCKET_DGRAM corresponding to a non-connected (datagram) service and transmits the selected SOCKET_DGRAM to the socket adaptation layer 54 of the gateway in step 512. In step 510, the 6LoWPAN sets a protocol that supports the socket. If the protocol is set to 0, the system is automatically set.

The socket adaptation layer 54 transmits a file descriptor allocation request to a virtual interface unit 55 in step 514 and the virtual interface unit 55 generates a predetermined IPv6 address and allocates it in step 516. The socket is generated in the socket adaptation layer 54 and the socket adaptation layer 54 transmits information about the socket to the socket adaptation layer 56 of the 6LoWPAN node. The socket adaptation layer 56 of the 6LoWPAN node returns the socket information including a socket number and a socket address to a socket API 57 in step 520.

Figure 5B:
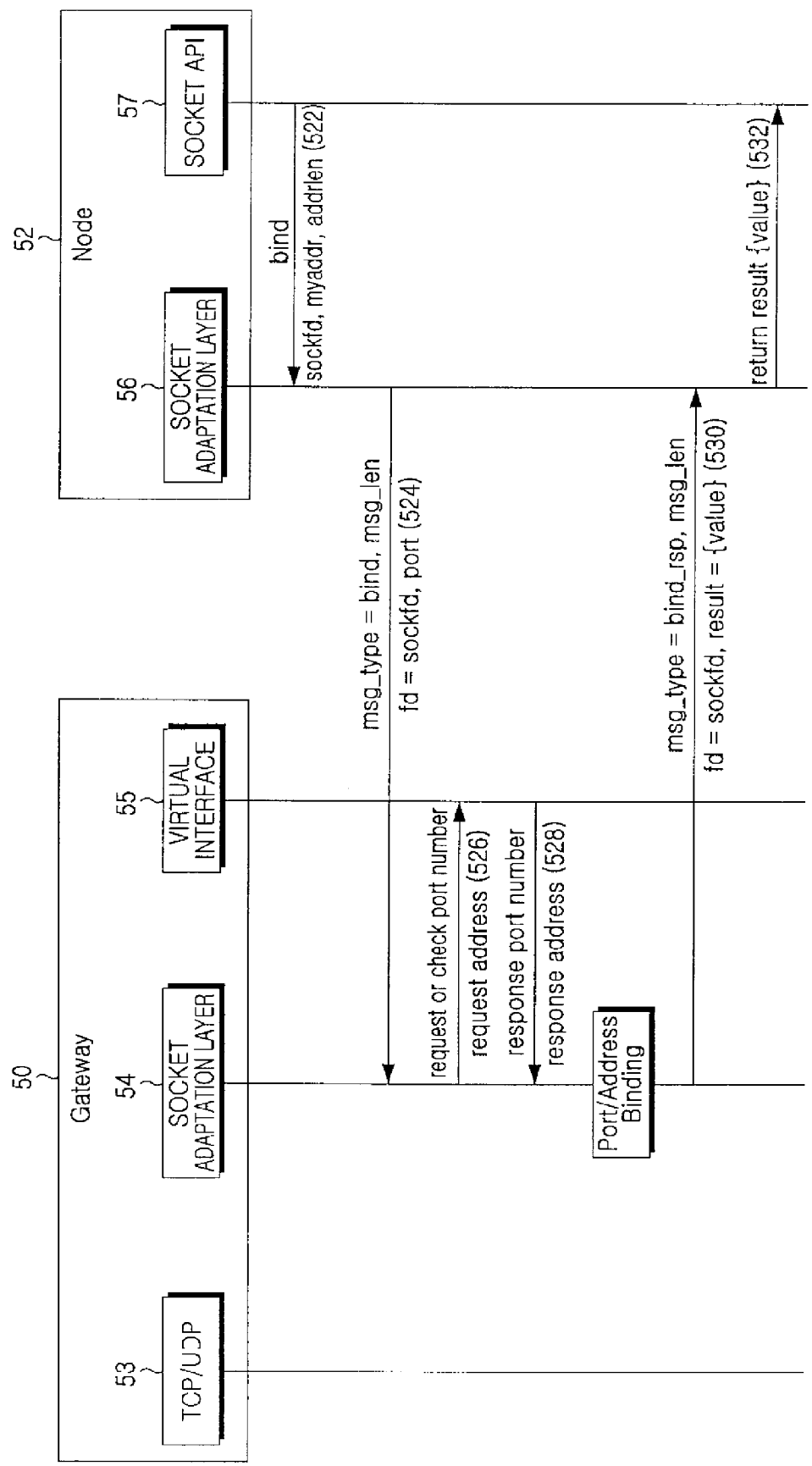

Binding is required between the socket number and the socket address as follows with reference to FIG. 5B.

A binding request is programmed to primitive: int bind(int sockfd, struct sockaddr *my_addr, socklen_t addrlen). Binding takes place in the 6LoWPAN node 52 and the gateway apparatus 50, as illustrated in FIG. 5B. The socket number is the number of a communication port that an application program is aware of and the socket address is an address known to the network system, that is, the TCP/IP. Hence, according to the present invention, IPv6 packets can be delivered between an application process and the network system by binding the socket number and the socket address.

Figure 6A:
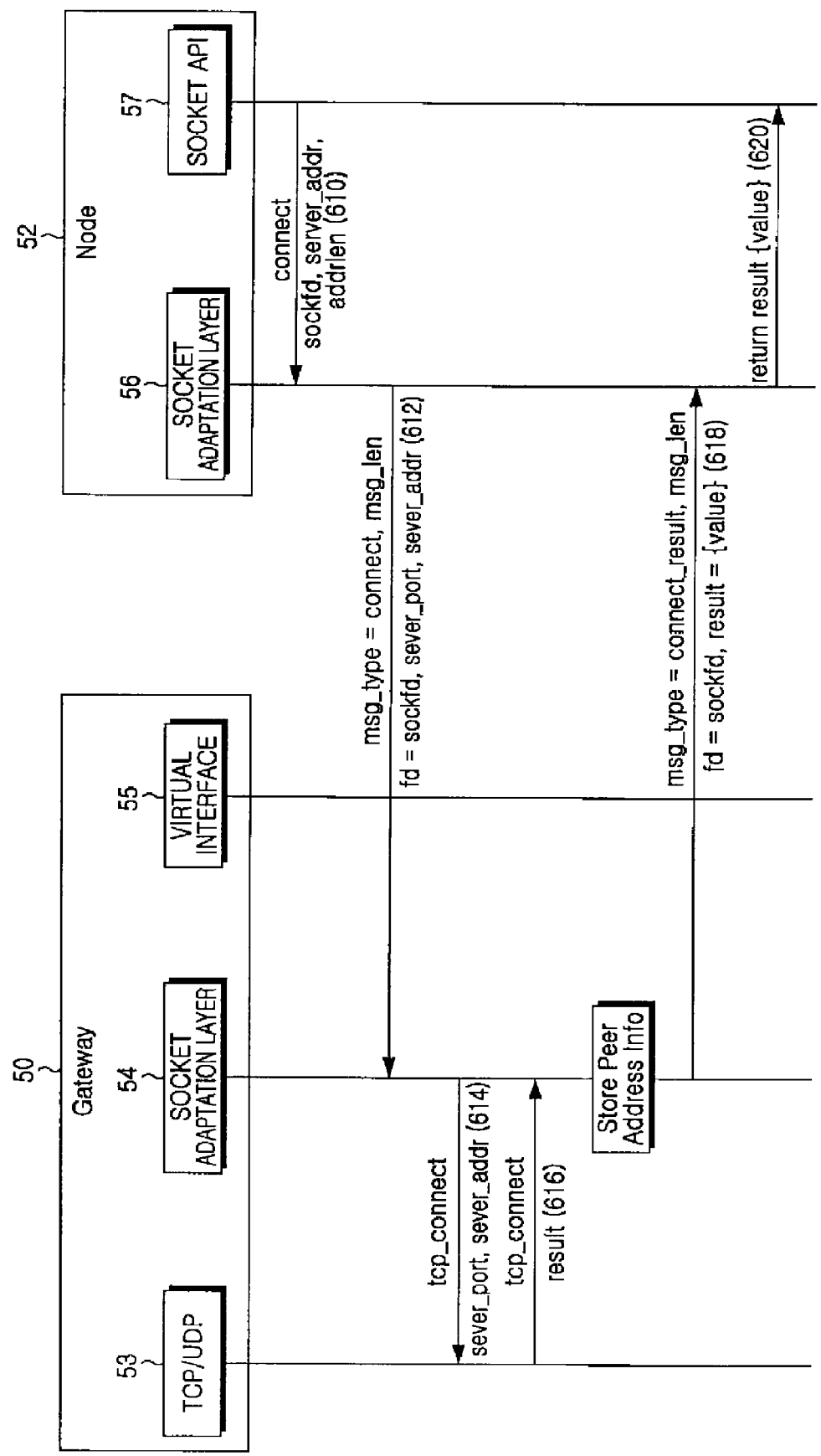

Then, the 6LoWPAN node 52 requests a connection to the gateway apparatus 50. The connection request is programmed to primitive: int connect(int sockfd, const struct sockaddr *serv_addr, socklen_t addrlen). An actual connection procedure between the 6LoWPAN node 52 and the gateway apparatus 50 is illustrated in FIG. 6A. If the connection between the 6LoWPAN node 52 and the gateway apparatus 50 is successful, the gateway apparatus 50 can transmit and receive data to and from the 6LoWPAN node 52, which means a connected service, i.e. a TCP process.

Figure 6B:
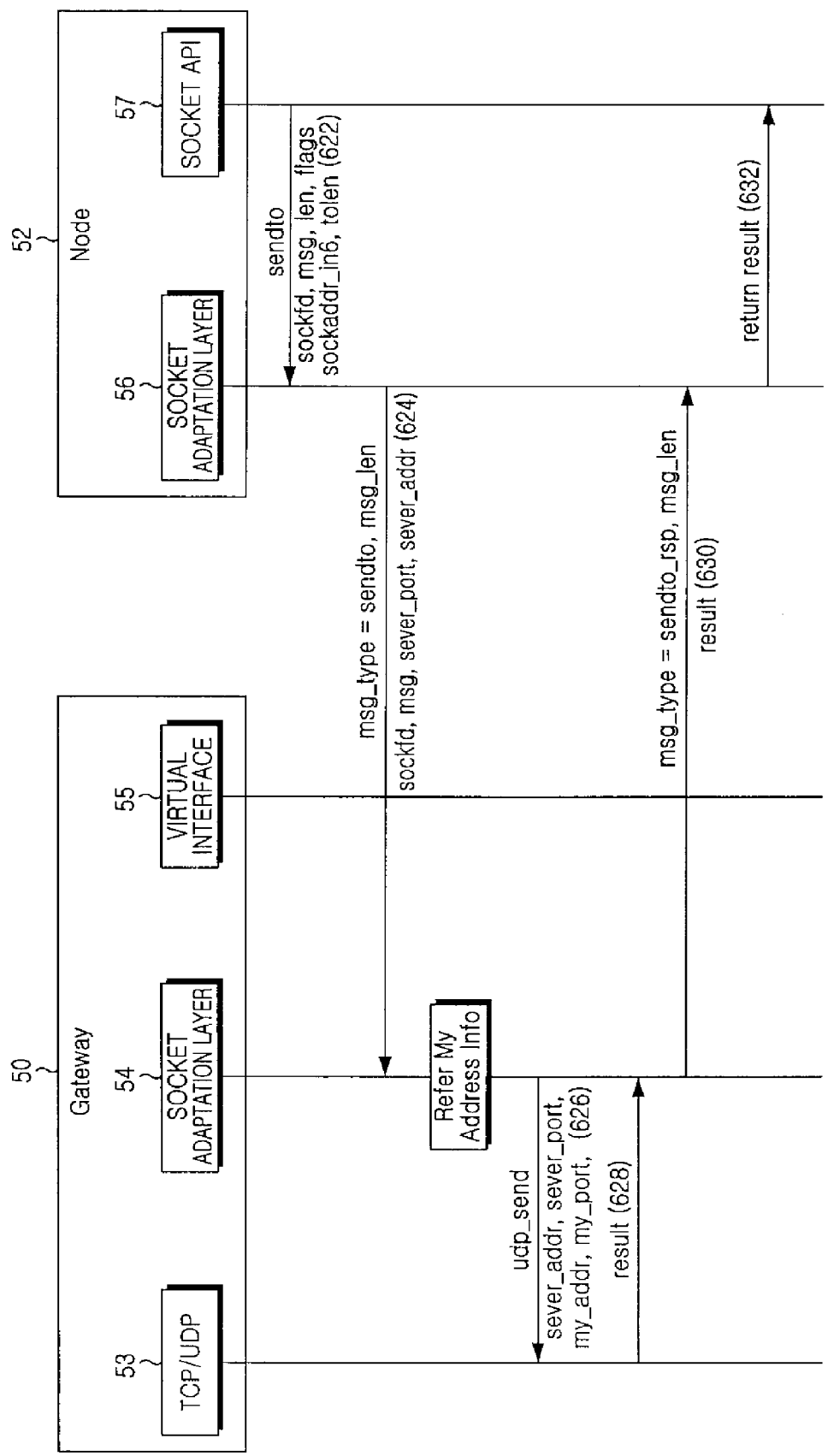

A non-connected (UDP) data transmission between the gateway apparatus 50 and the 6LoWPAN node 52 is programmed to primitive: int sendto(int sockfd, const void *msg, size_t len, int flags, const struct sockaddr *to, socklen_t tolen). An actual transmission is carried out between the 6LoWPAN node 52 and the gateway apparatus 50 as illustrated in FIG. 6B.

Figure 7A:
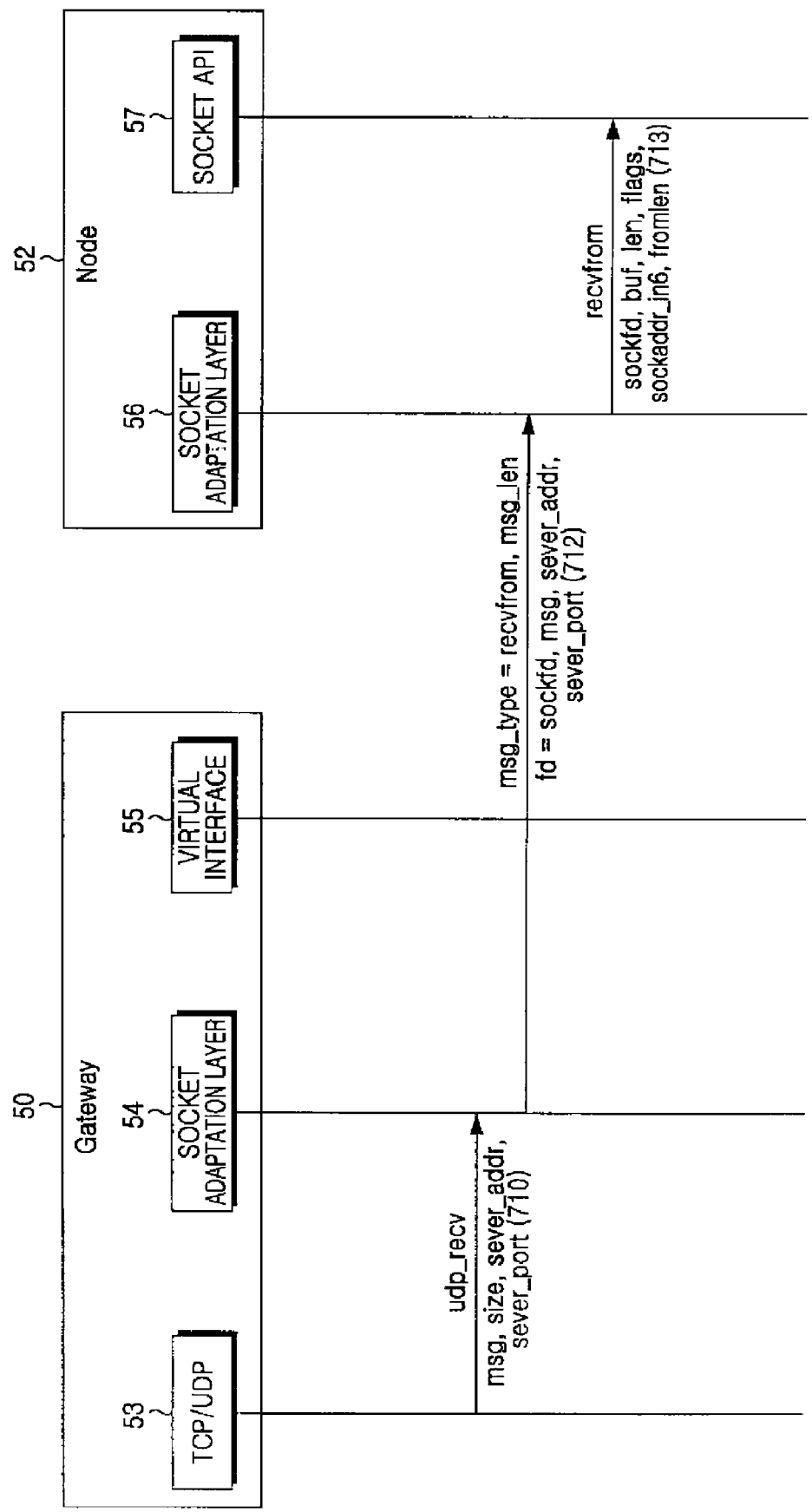

Data reception between the gateway apparatus 50 and the 6LoWPAN node 52 is programmed to primitive: int recvfrom (int sockfd, void *buf, size_t len, int flags, struct sockaddr *from, socklen_t *fromlen). An actual reception is carried out between the 6LoWPAN node 52 and the gateway apparatus 50 as illustrated in FIG. 7A.

Figure 7B:
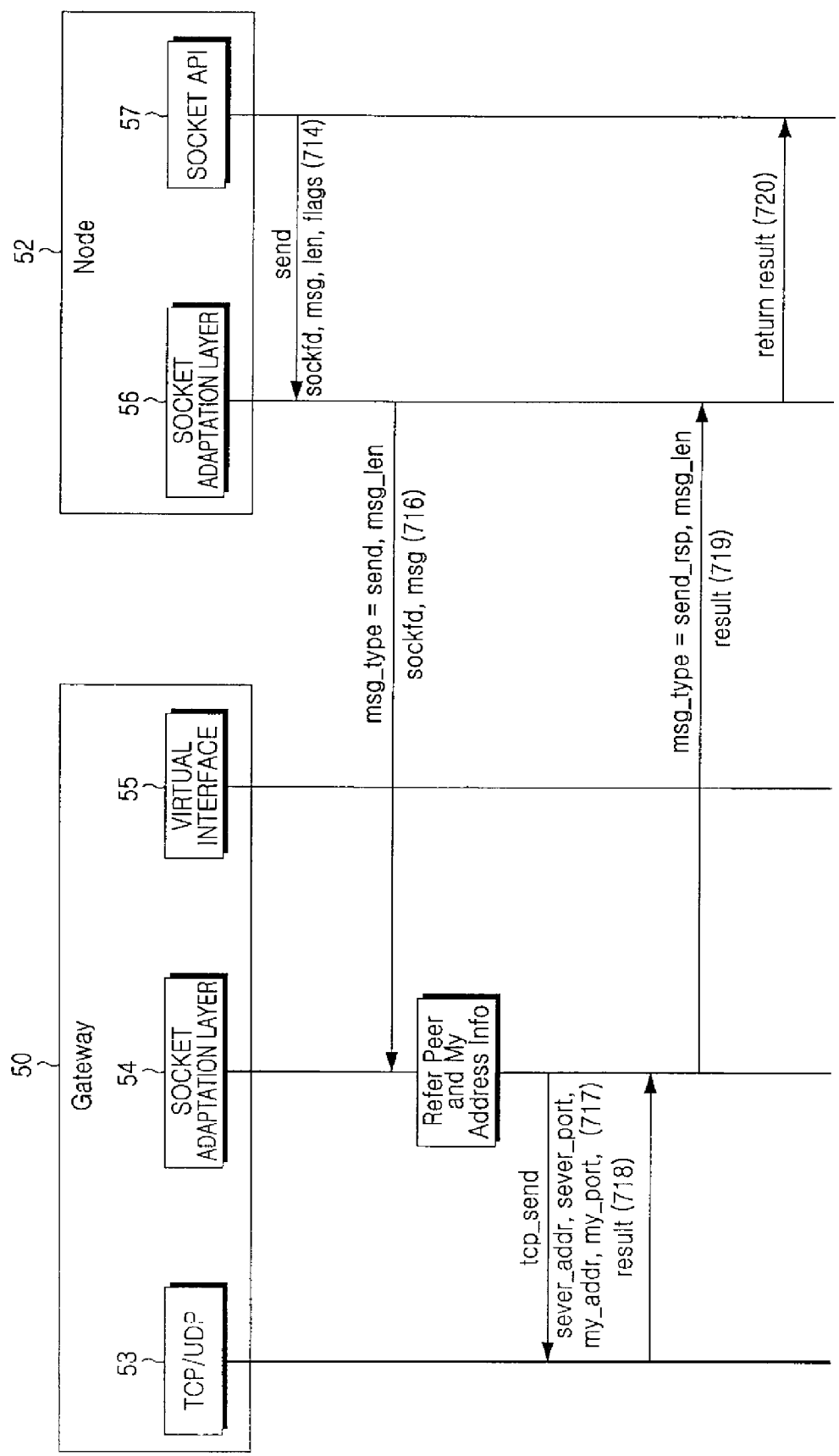

Data transmission between the gateway apparatus 50 and the 6LoWPAN node 52 is programmed to primitive: int send (int sockfd, const void *msg, size_t len, int flags). An actual transmission is carried out between the 6LoWPAN node 52 and the gateway apparatus 50 as illustrated in FIG. 7B.

Figure 8A:
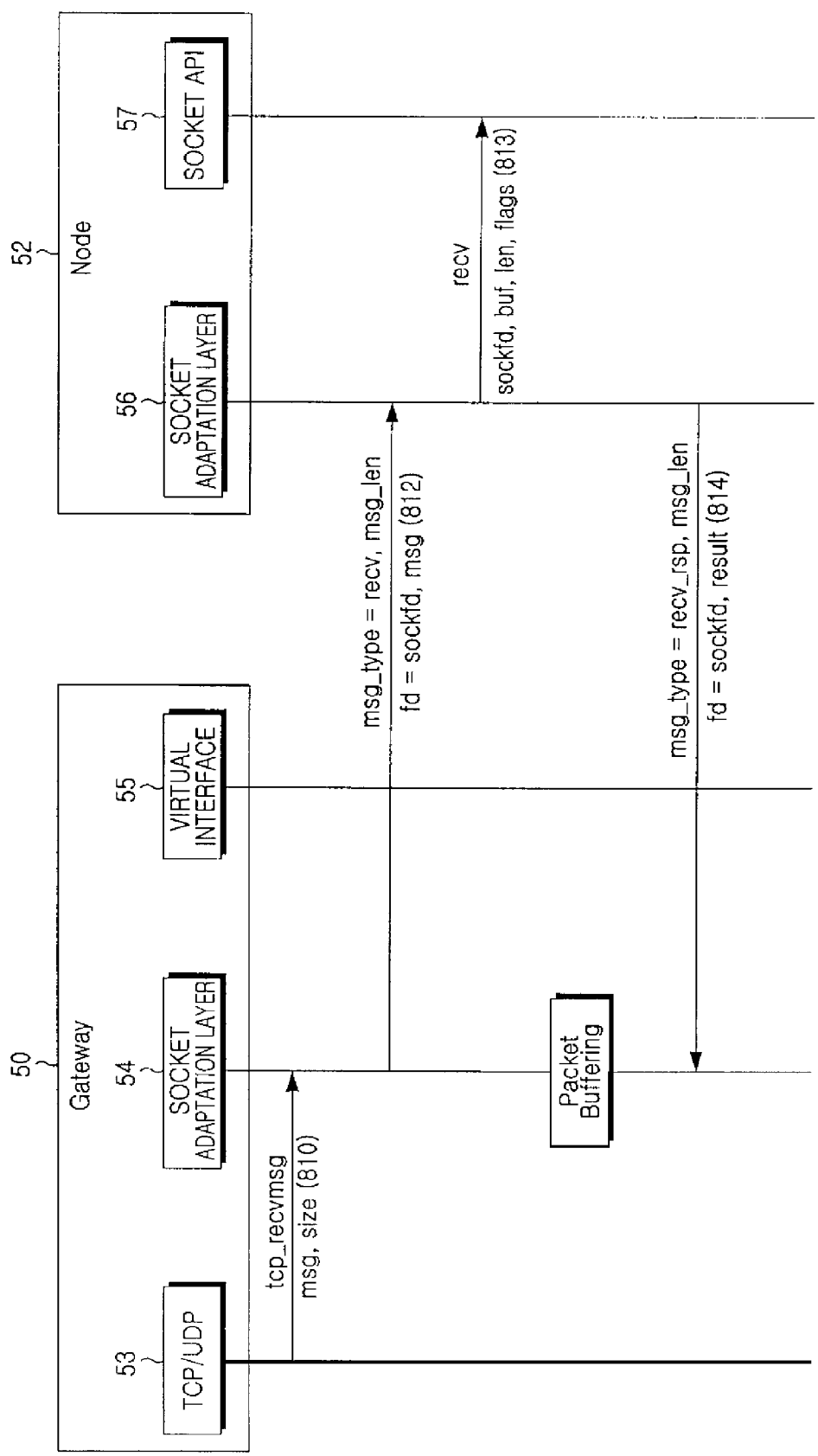

Data reception between the gateway apparatus 50 and the 6LoWPAN node 52 is programmed to primitive: int recv(int sockfd, void *buf, size_t len, int flags). An actual reception is carried out between the 6LoWPAN node 52 and the gateway apparatus 50 as illustrated in FIG. 8A.

Figure 8B:
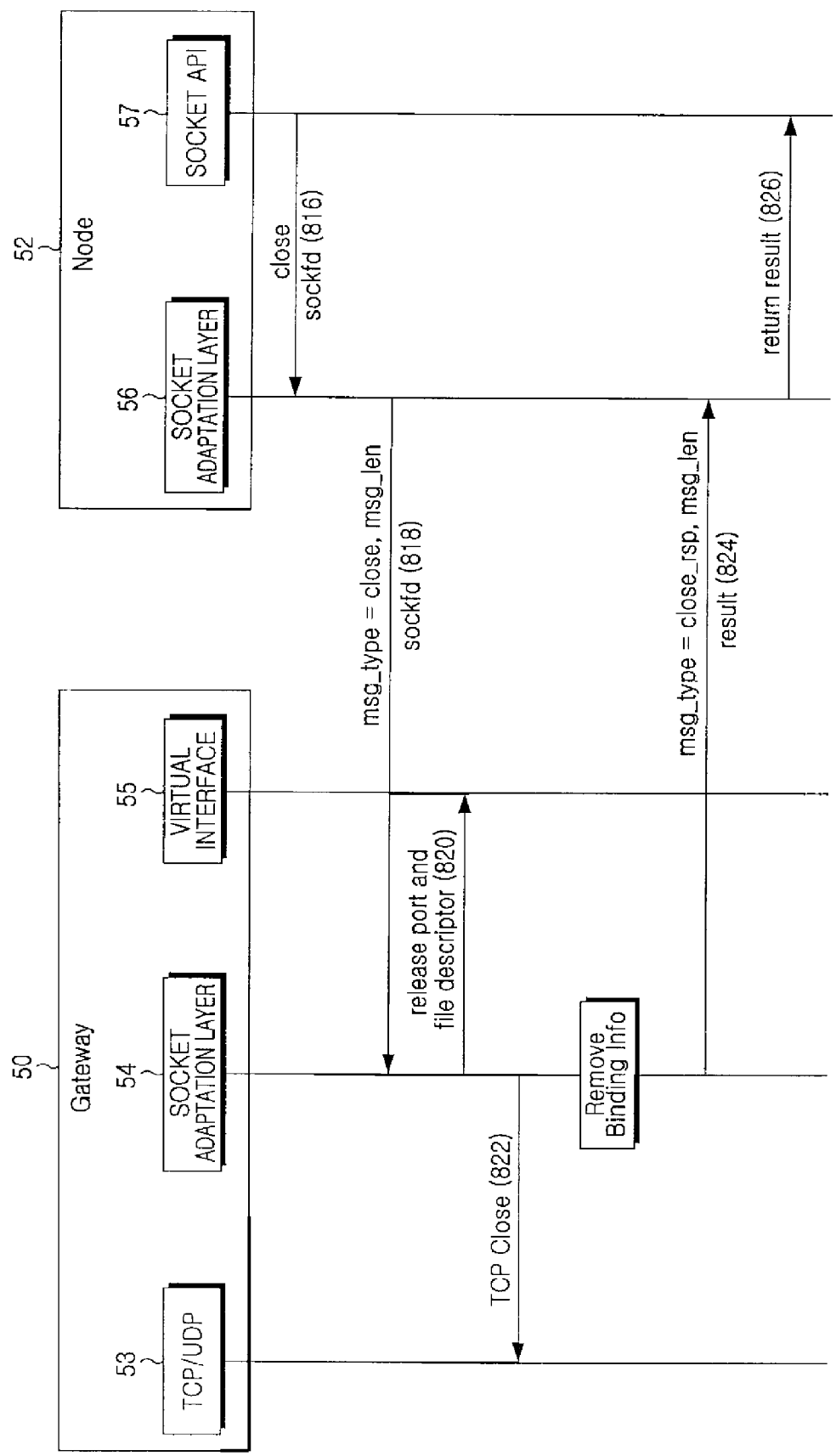

In the examples discussed herein above, the gateway apparatus 50 and the 6LoWPAN node 52 generate a TCP socket and are connected to the TCP socket. After data transmission and reception, they terminate the TCP socket, which is programmed to primitive: int close(int sockfd). The socket termination is performed between the 6LoWPAN node 52 and the gateway apparatus 50 as illustrated in FIG. 8B.

As is apparent from the above description, according to the present invention, a gateway takes over a TCP/IP protocol stack from a legacy 6LoWPAN node in the method and apparatus for providing a gateway for IPv6 packet transmission in a WLAN system according to the exemplary embodiment of the present invention. Therefore, traffic is reduced in a 6LoWPAN link and the load of 6LoWPAN nodes is decreased, thereby increasing their overall lifetime.

Further, since the gateway processes a HOP-by-HOP Options Header, Routing Header, a Fragment Header, and a Destination Options Header that cannot be processed in the legacy 6LoWPAN node, every IPv6 header can be eventually processed.

Accordingly, the method and apparatus for providing a gateway for IPv6 packet transmission in a WLAN system according to the exemplary embodiment of the present invention has been described herein above. While the invention has been shown and described with reference to certain exemplary embodiments of the present invention thereof, it will be understood by those skilled in the art that various changes in form and details may be made therein without departing from the spirit of the invention and the scope of the appended claims. For example, the inventive aspects of the present invention will be compatible with future IP versions, and the invention is not limited to IPv6 transmission.

What is claimed is:

1. A method for providing a gateway for Internet Protocol version 6 (IPv6) packet transmission in a Wireless Local Area Network (WLAN) system, comprising:

receiving service request messages for data communications from a plurality of IPv6 over Low Power Wireless Personal Area Network (6LoWPAN) nodes;

generating a virtual interface for allocating IPv6 addresses to the 6LoWPAN nodes by adding a predetermined IPv6 address prefix to addresses of the 6LoWPAN nodes set in the service request messages;

interfacing a socket adaptation layer of a 6LoWPAN middleware for receiving the IPv6 addresses from the virtual interface and transmitting data packets to the 6LoWPAN nodes; and said 6LoWPAN middleware:

(1) controlling and managing an on-going file and routing data packets, when the data packets are transmitted and received to and from the 6LoWPAN nodes, (2) updating a routing table for controlling a routing path for a received IPv6 packet directed to an address of each of the 6LoWPAN nodes; and (3) generating a file descriptor pool for accessing the on-going file and a port pool for storing a port number.

2. The method of claim 1, wherein the service request messages comprise Association_Indications.

3. The method of claim 1, wherein the virtual interface is generated for each 6LoWPAN node.

4. The method of claim 1, further comprising, if an address of a data packet is an address of another host, interfacing to the host via a network layer and a Media Access Control/Physical (MAC/PHY) layer.

5. The method of claim 1, wherein the interfacing of the socket adaptation layer comprises interfacing the socket adaptation layer in correspondence with a socket adaptation layer of a 6LoWPAN node.

6. A gateway apparatus for Internet Protocol version 6 (IPv6) packet transmission in a Wireless Local Area Network (WLAN) system, comprising:

a IPv6 over Low Power Wireless Personal Area Network (6LoWPAN) socket adaptation layer for interfacing with socket adaptation layers of a plurality of 6LoWPAN nodes and receiving data communication request messages from the 6LoWPAN nodes;

a virtual interface for allocating IPv6 addresses to the 6LoWPAN nodes by adding a predetermined IPv6 address prefix to addresses of the 6LoWPAN nodes; and a 6LoWPAN middleware including a Transmission Control Protocol/User Datagram Protocol (TCP/UDP) layer for controlling and managing an on-going file and routing data packets, when the data packets are transmitted and received to and from the 6LoWPAN nodes;

wherein the virtual interface comprises:

an address allocator for allocating the IPv6 addresses to the 6LoWPAN nodes by adding the predetermined IPv6 address prefix to the addresses of the 6LoWPAN nodes;

a controller for updating a routing table for controlling a routing path for a received IPv6 packet directed to an address; and a generator for generating a file descriptor pool for accessing the on-going file and a port pool for storing a port number.

7. The gateway apparatus of claim 6, wherein the virtual interface performs data communications with a host other than the 6LoWPAN nodes.

8. The gateway apparatus of claim 6, wherein the virtual interface is generated for each of the 6LoWPAN nodes.

9. The gateway apparatus of claim 6, wherein the virtual interface is generated for each of the 6LoWPAN nodes.

10. The gateway apparatus according to claim 6, further comprising a protocol stack including a MAC/PHY layer, an adaptation layer, an 802.15.4 MAC/PHY layer, a network layer, a transport layer, a socket layer, an application layer, and a 6LoWPAN middleware.

11. A gateway apparatus for Internet Protocol version 6 (IPv6) packet transmission in a Wireless Local Area Network (WLAN) system, comprising:
- a TCP/UDP for 6LowPAN protocol layer for receiving service request messages for data communications from a plurality of IPv6 over Low Power Wireless Personal Area Network (6LoWPAN) nodes;
- a virtual interface unit for allocating IPv6 addresses to the 6LoWPAN nodes by adding a predetermined IPv6 address prefix to addresses of the 6LoWPAN nodes set in the service request messages;
- a socket adaptation layer interfaced for receiving the IPv6 addresses from the virtual interface unit and transmitting data packets to the 6LoWPAN nodes; and
- a controller for controlling and managing an on-going file and routing data packets when the data packets are transmitted and received to/from the 6LoWPAN nodes;
- a 6LoWPAN middleware or implementing a TCP/IP protocol stack from a legacy 6LoWPAN node for providing a gateway for IPv6 packet transmission; and
- a generator for generating a file descriptor pool for accessing the on-going filed and a port pool for storing a port number.

12. The gateway apparatus according to claim 11, wherein the virtual interface is generated for each 6LoWPAN node.

13. The gateway apparatus according to claim 11, further comprising a protocol stack including a MAC/PHY layer, an adaptation layer, an 802.15.4 MAC/PHY layer, a network layer, a transport layer, a socket layer, an application layer.

* * * * *